(12) United States Patent
Murali Dora et al.

(10) Patent No.: US 8,093,746 B2
(45) Date of Patent: Jan. 10, 2012

(54) CONTROL OF FOUR-LEG TRANSFORMERLESS UNINTERRUPTIBLE POWER SUPPLY

(75) Inventors: Krishna Murali Dora, Hyderabad (IN); Silvio Colombi, Losone (CH); Prabhakar Krishna Nerella, Hyderabad (IN); Narender Reddy Katukuri, Hyderabad (IN); Yashomani Y. Kolhatkar, Hyderabad (IN)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 12/639,613

(22) Filed: Dec. 16, 2009

(65) Prior Publication Data

US 2011/0141783 A1 Jun. 16, 2011

(51) Int. Cl.
*H02J 1/00* (2006.01)
(52) U.S. Cl. .......................................................... 307/6
(58) Field of Classification Search .................. 307/6
See application file for complete search history.

(56) References Cited

U.S. PATENT DOCUMENTS

| | | | |
|---|---|---|---|
| 5,343,079 A | 8/1994 | Mohan et al. | |
| 6,404,655 B1 | 6/2002 | Welches | |
| 6,879,053 B1 | 4/2005 | Welches et al. | |
| 6,924,993 B2 | 8/2005 | Stancu et al. | |
| 6,950,321 B2 | 9/2005 | Stancu et al. | |
| 2003/0076696 A1 | 4/2003 | Tsai | |
| 2007/0182383 A1 | 8/2007 | Park et al. | |

FOREIGN PATENT DOCUMENTS

| | | |
|---|---|---|
| JP | 8251941 A | 9/1996 |
| JP | 2007159276 A | 6/2007 |

OTHER PUBLICATIONS

M.E. Fraser, et al. "Transformerless four-wire PWM rectifier and its application in AC-DC-AC converters", IEE Proceedings—vol. 142, Issue 6, Nov. 1995 pp. 410-416.

*Primary Examiner* — Robert L. DeBeradinis
(74) *Attorney, Agent, or Firm* — GE Global Patent Operation; Catherine J. Toppin

(57) ABSTRACT

A system and method for managing a 4 leg transformerless Uninterrupted Power Supply is disclosed. The system comprises a 3 leg inverter modulation signal generator that applies signals to a modulation circuit that generates a $4^{th}$ leg modulation signal based on the applied 3 leg inverter modulation signal characteristics. The determined $4^{th}$ modulation signal modifies the 3 leg inverter modulation signals and rectifier modulation signals, which are applied to corresponding inverter and rectifier sections of an Uninterruptible Power Supply.

23 Claims, 5 Drawing Sheets

CONTROL OF FOUR-LEG TRANSFORMERLESS UNINTERRUPTIBLE POWER SUPPLY

FIELD OF THE INVENTION

The present invention relates to the field of Uninterruptible Power Supplies (UPS) and more particularly to control of a four-leg transformerless UPS for neutral current cancellation and low input current harmonic distortion in any load condition.

BACKGROUND OF THE INVENTION

Considerable increases in the utilization of electrical energy over the last few years has occurred as more electrical equipment is being used or installed by an increasing number of users or customers. Along with the demand for electrical energy, the demand for its quality has also increased. No longer is variation in the voltage level, frequency or phase acceptable. Particularly, in applications such as hospitals, process intensive industries, data centers, etc, the quality of the provided electrical energy is especially important.

Uninterruptible Power Supplies, which provide a source of power during interruptions in main electrical generation, generally accept two inputs; one for its rectifier and the other for the bypass circuit. If the customer is willing to have a 4 wire output the customer, typically, has to supply 4 wires also for the bypass circuit. The fourth wire or neutral wire for the bypass will be permanently connected to the output neutral. When the UPS is working in normal double conversion mode, the inverter has to generate the neutral and should ensure its potential is stable with respect to a reference value (e.g., a ground or zero voltage level). This can be achieved by either taking a four wire input for the rectifier and use the 4th wire (i.e., rectifier input neutral) as a load neutral or take a three wire input for the rectifier and by well-known technique generate a 4th wire in inverter.

For the UPS with output isolation transformers, the three-wire input and four-wire output configuration is solved with the output transformer. This provides a galvanic isolation, but considerably increases the weight of the UPS and often affects its footprint and Cost. Transformerless UPS designs are known in the art. See for example, "Transformerless Four-Wire PWM Rectifier and its Application to AC-DC-AC Converters," Fraser, M. E., et al., IEE Proceedings on lone no. 19952278, 1995).

However, conventional designs suffer from high input current harmonic distortion at non-linear and unbalanced loads.

Hence, there is a need in the industry for a transformerless UPS having at least a low input total harmonic distortion.

SUMMARY OF THE INVENTION

As described herein, the embodiments of the present invention overcome one or more of the above or other disadvantages known in the art.

One aspect of the invention relates to a system for managing a four-leg transformerless Uninterrupted Power Supply (UPS) comprising: a rectifier modulation signal generator generating rectifier modulation signals; a 3-leg inverter modulation signal generator generating inverter modulation signals, a conversion module receiving said rectifier modulation signals and said inverter modulation signals and determining compensated rectifier modulated signals and 4 leg inverter modulation signals based on at least one of a measured rectified DC voltage and a frequency of said input AC signal; a rectifier PWM signal generator receiving said compensated rectifier modulated signals generating PWM rectifier signals; a 4-leg inverter PWM signal generator receiving said 4 leg inverter modulation signals generating PWM inverter signals and a UPS comprising: a rectifier section receiving an input AC signal and rectifying said input signal based on said modulated Pulse Width Modulated (PWM) rectifier signals; an inverter section receiving and inverting the rectified DC signals based on said modulated inverter Pulse Width Modulated inverter signals.

Another aspect of the invention relates to A method for managing a four-leg transformerless Uninterrupted Power Supply (UPS) a rectifier section and a 4 leg inverter section, the rectifier section receiving compensated rectifier control signals and said 4 leg inverter receiving inverter control signals, said method comprising: determining an input frequency of reference signals received from said AC input section; determining a $4^{th}$ leg modulation signal based on said input frequency, and determining said inverter control signals based on said 3 leg inverter modulation signals and said determined $4^{th}$ leg modulation signal.

These and other aspects and advantages of the present invention will become apparent from the following detailed description considered in conjunction with the accompanying drawings.

BRIEF DESCRIPTION OF THE DRAWINGS

The embodiments shown in the accompanying drawings, and described in the accompanying detailed description are to be used as illustrative embodiments and should not be construed as the only manner of practicing the invention. Also, the same reference numerals, possibly supplemented with reference characters where appropriate, have been used to identify similar elements.

It is to be understood that the figures and descriptions of the present invention have been simplified to illustrate elements that are relevant for a clear understanding of the present invention, while eliminating, for the purpose of clarity many other elements found in conventional systems of the type described herein. Those of ordinary skill of the art may recognize that other elements and/or steps are desirable and/or required in implementing the present invention. However, because such elements and steps are well-known in the art, and because they do not facilitate a better understanding of the present invention, a discussion of such elements and steps is not provided herein.

DETAILED DESCRIPTION OF PREFERRED EMBODIMENTS OF THE INVENTION

Figure 1:
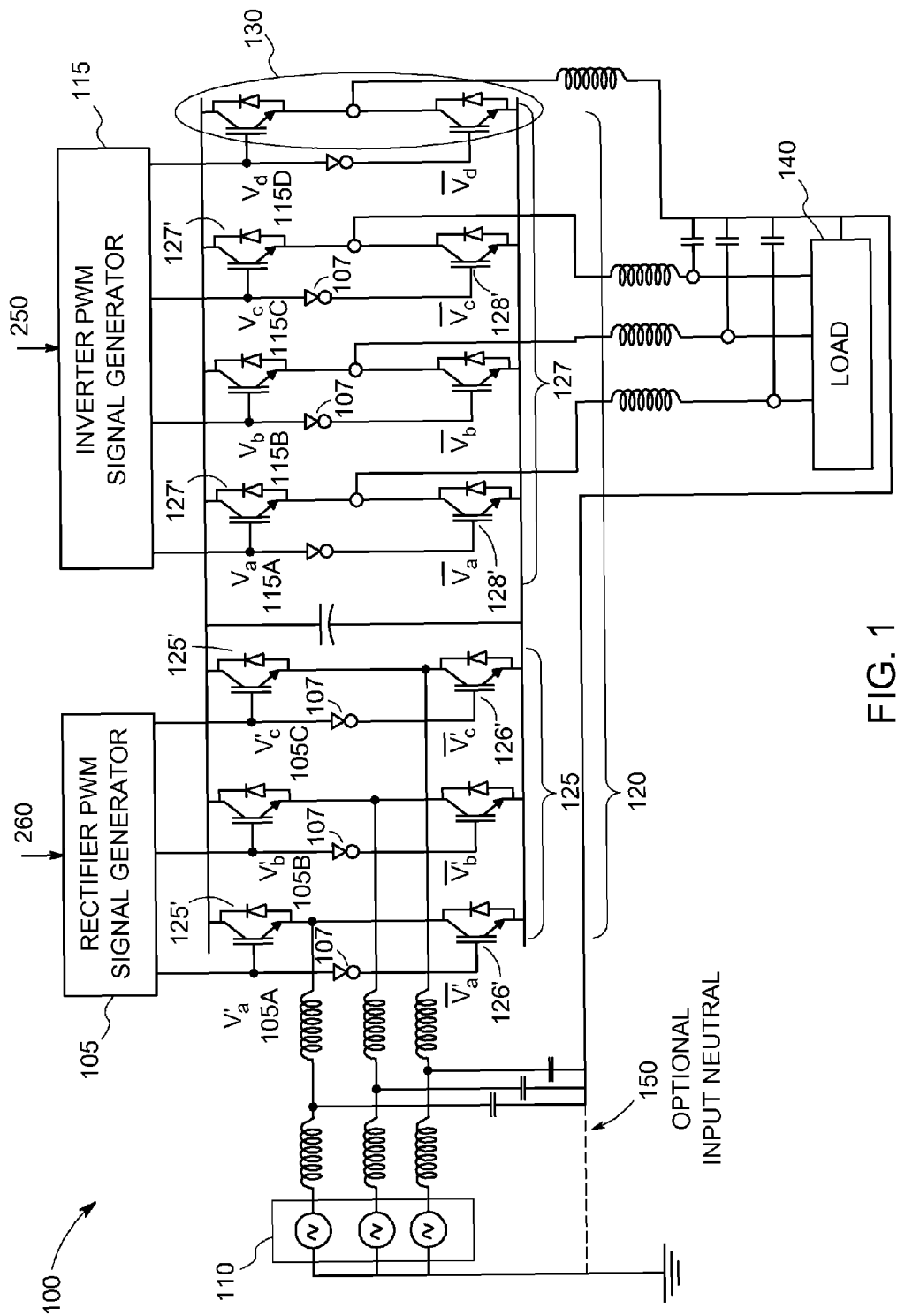
FIG. 1 illustrates a schematic circuit diagram of a 3-wire input/4-wire output transformerless UPS.

FIG. 1 illustrates a schematic circuit diagram of a 3-wire input/4-wire output transformerless UPS 100 wherein a three-phase source 110 provides an electrical input to a voltage source rectifier 125 for conversion from AC-to-DC voltage and subsequent DC-to-AC voltage, which is then applied to load 140. UPS 120 includes AC-to-DC conversion section 125 to convert the inputted AC voltage to a DC voltage and DC-to-AC conversion section 127 to convert the provided DC voltage to an AC voltage. Also, shown is a 4-leg section 130 that provides a common neutral to load 140. An optional input neutral 150 is also shown. Optional neutral 150 represents a 4-wire input configuration.

Rectifier section 125 is composed of switches 125' that receive switching signals Va' 105A, Vb' 105B, Vc' 105C provided by rectifier PWM signal generator module 105. The signals Va' 105A, Vb' 105B, Vc' 105C are then provided to corresponding inverters 107 and applied to the gate node of switches 126'. The input to the rectifier PWM signal generator module 105 are the compensated rectifier modulation signals 260 and its outputs are the switching signals Va' 105A, Vb' 105B, Vc' 105C. Compensated rectifier modulation signals 260 are more fully described with regard to FIGS. 2A and 2B.

DC-to-AC conversion section 127 is similarly composed of switches 127' that receive switching signals $V_a$ 115A, $V_b$ 115B, $V_c$ 115C and $V_n$ 115D, which represent 4 leg inverter PWM signals from 4 leg Inverter PWM Signal Generation module 115. The signals $V_a$ 115A, $V_b$ 115B, $V_c$ 115C and $V_n$ 115D are further applied to corresponding logic inverters 107 and the inverted signal is applied to the gate node of switches 128'.

Figure 2A:
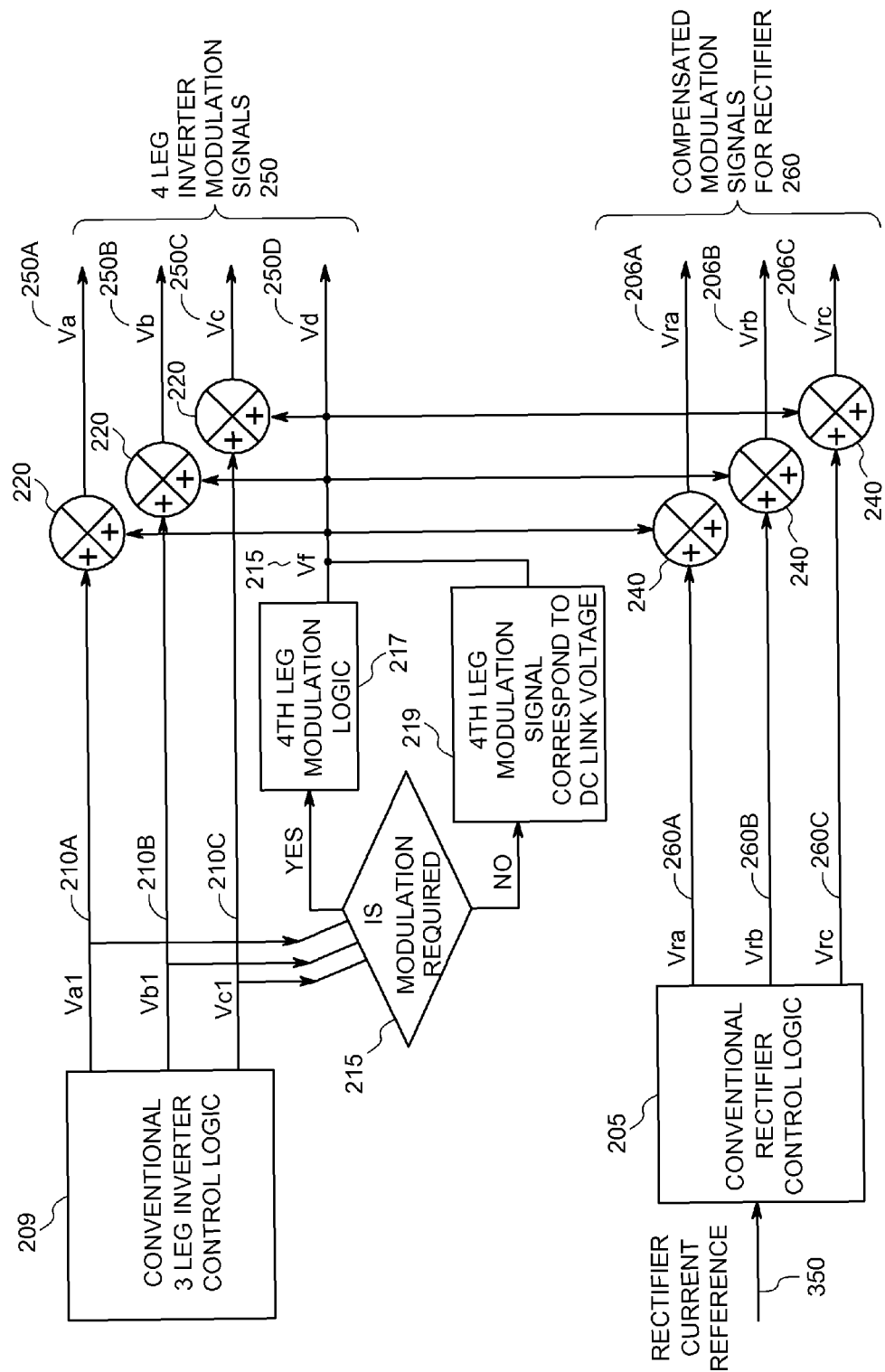
FIG. 2A illustrates an exemplary embodiment of a control scheme in accordance with the principles of the invention.

FIG. 2A illustrates an exemplary embodiment of a control scheme in accordance with the principles of the invention, wherein reference signals generated from the output of a conventional 3-leg inverter control logic module 299, shown as $V_{af}$ 210A, $V_{bf}$ 210B and $V_{cf}$ 210C, are provided to corresponding adders 220 and modulation circuit 215 in accordance with the principles of the invention. Modulation circuit 215 determines whether a modulation is required, as will be described in further detail with regard to FIG. 2B. When modulation is determined to be required, than an appropriate modulation is determined at block 217. Otherwise, a predetermined modulation corresponding to half the DC link voltage of the UPS 100 is outputted. The determined or predetermined modulation (i.e., signal $V_f$ 235) along with the conventional modulation signals $V_{af}$ 210A, $V_{bf}$ 210B and $V_{cf}$ 210C are then applied to corresponding adders 220 to obtain 4-leg inverter modulation signals $V_a$ 250A, $V_b$ 250B, $V_c$ 250C and $V_n$ 250D (collectively referred to as 250). The 4-leg inverter modulation signals 250 thus generated are inputted to 4 leg inverter PWM signal generator 115 (see FIG. 1).

Conventional Rectifier Modulation signals $V_{ra}$ 206A, $V_{rb}$ 206B, $V_{rc}$ 206C, obtained from a conventional rectifier control loop module 205, are applied to corresponding adders 240. The determined or pre-determined modulation signal (i.e., $V_f$ 235) from blocks 217 or 219 is also applied to adders 240 to generate compensated modulation signals for rectifier $V_{ra}'$ 260A, $V_{rb}'$ 260B, $V_{rc}'$ 260C, which are collectively referred to as signal 260. The compensated modulation signal 260 thus obtained is inputted to Rectifier PWM signal generator 105 (see FIG. 1).

In one aspect of the invention, the need for modulation is determined at block 215 wherein an output frequency ($F_{out}$) is deemed to be equal (i.e., synchronized) to an input frequency ($F_{in}$) when the input frequency is within an acceptable range or tolerance value. In one aspect of the invention, the acceptable range may be represented as +/−2 percent of the rated input frequency. Conventional input frequencies are in the order of a nominal value of 50 Hz or 60 Hz, depending upon the particular electrical system involved. However, the actual frequency values of the system are known to vary from the nominal frequency value. In one case, the output frequency is set equal to the input frequency. In this case, the modulation signal of the fourth leg $V_f$ is set as shown in FIG. 2B.

However, when the input frequency is outside the acceptable range, then the output frequency is fixed at a specified value. In one aspect of the invention, the specified value is determined based on the frequency of the electrical system in which the rectifier operates. For example, the specified frequency value may be set to 60 Hz when the system is operating in an electrical system that operates on a 60 Hz frequency (e.g., United States). Similarly, the specified frequency may be set to 50 Hz when the system is operating in an electrical system that operates at 50 Hz frequency (e.g., Europe).

In this mode, which is referred to as "free-running," the input and output frequencies are not equal and the modulation is set to a predetermined value equal to a signal corresponding to half of the DC link voltage of UPS 100 (i.e., block 219).

Figure 2B:
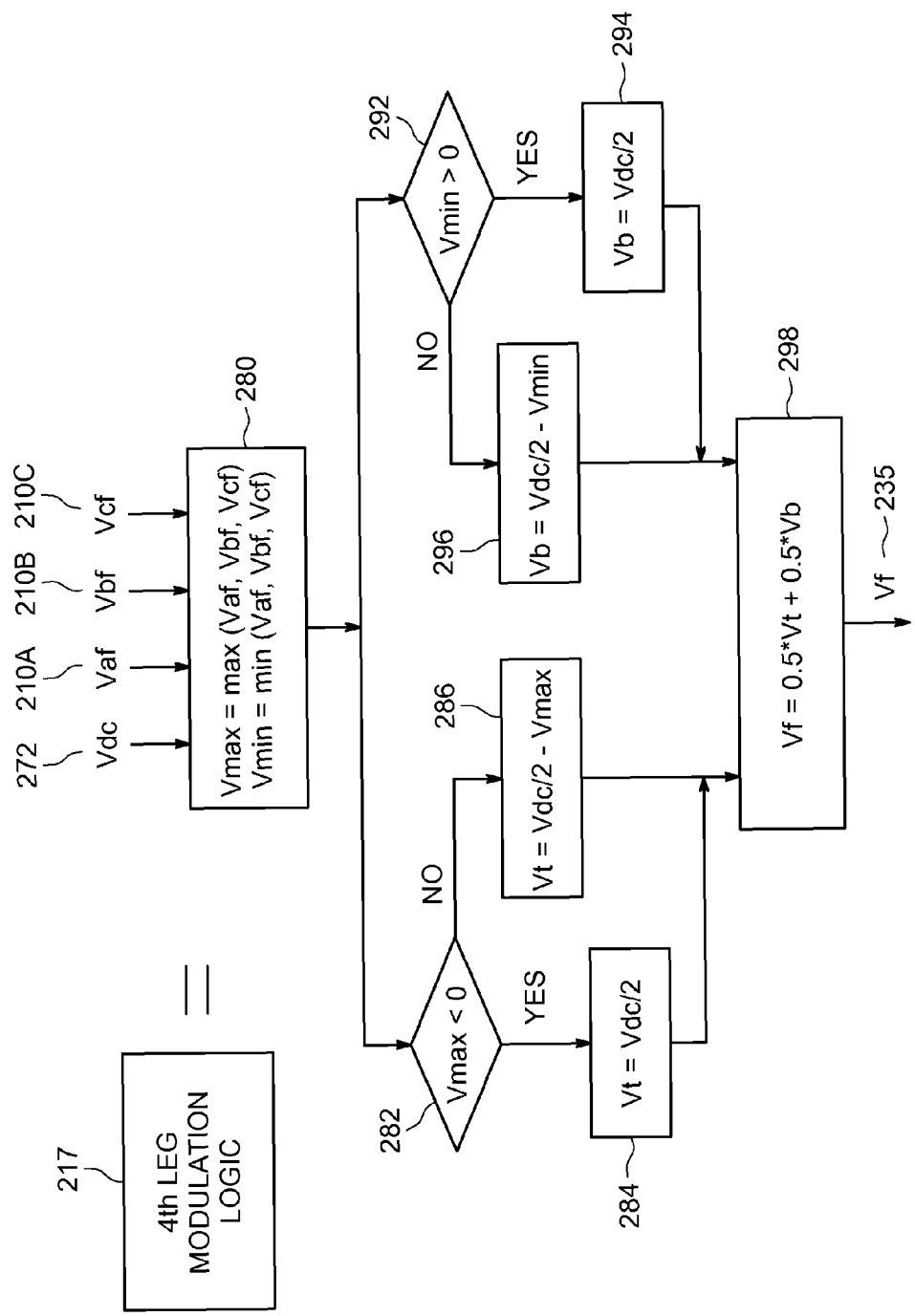
FIG. 2B illustrates a flow chart of an exemplary process for determining a control voltage in accordance with the principles of the invention.

FIG. 2B illustrates an exemplary process for determining a level of modulation, i.e, block 217, when modulation is determined to be required in block 215. In this illustrated process, the signals $V_{af}$ 210A, $V_{bf}$ 210B and $V_{cf}$ 210C are applied to block 280 to determine a maximum voltage value ($V_{max}$) and a minimum voltage value ($V_{min}$). A signal $V_{dc}$ 272 (corresponding to the set DC link voltage of UPS 100) is also applied to block 280 but is not used to determine either the minimum or maximum voltages.

A determination is then made whether the $V_{max}$ is less than zero at block 282. If $V_{max}$ is less than zero, then variable $V_t$ is set to one-half of the input $V_{dc}$ at block 284. Otherwise, $V_t$ is set to one-half of the input $V_{dc}$ adjusted by $V_{max}$ at block 286. $V_t$ represents an intermediate variable used to develop a final value as is further discussed.

Concurrently (or sequentially) a determination is made whether the minimum voltage, $V_{min}$ is greater than zero at block 292. If $V_{min}$ is greater than zero, then variable $V_b$ is set to minus one-half of the $V_{dc}$ at block 294. Otherwise, the variable $V_b$ is set to minus one-half of the Vdc adjusted by $V_{min}$ at block 296. The variable $V_b$ represents an intermediate variable used to develop a final value as is further discussed.

After both $V_t$ and $V_b$ are determined, then these values are applied at block 298, wherein, signal $V_f$ 235 is determined based on the values of $V_t$ and $V_b$. In this illustrated case, the signal $V_f$ 235 is determined as one-half of each of $V_t$ and $V_b$ (i.e., an average value) However, it would be recognized by those skilled in the art that a different combination of $V_t$ and $V_b$ is also possible without altering the scope of the invention (e.g., a weighted average).

Figure 3:
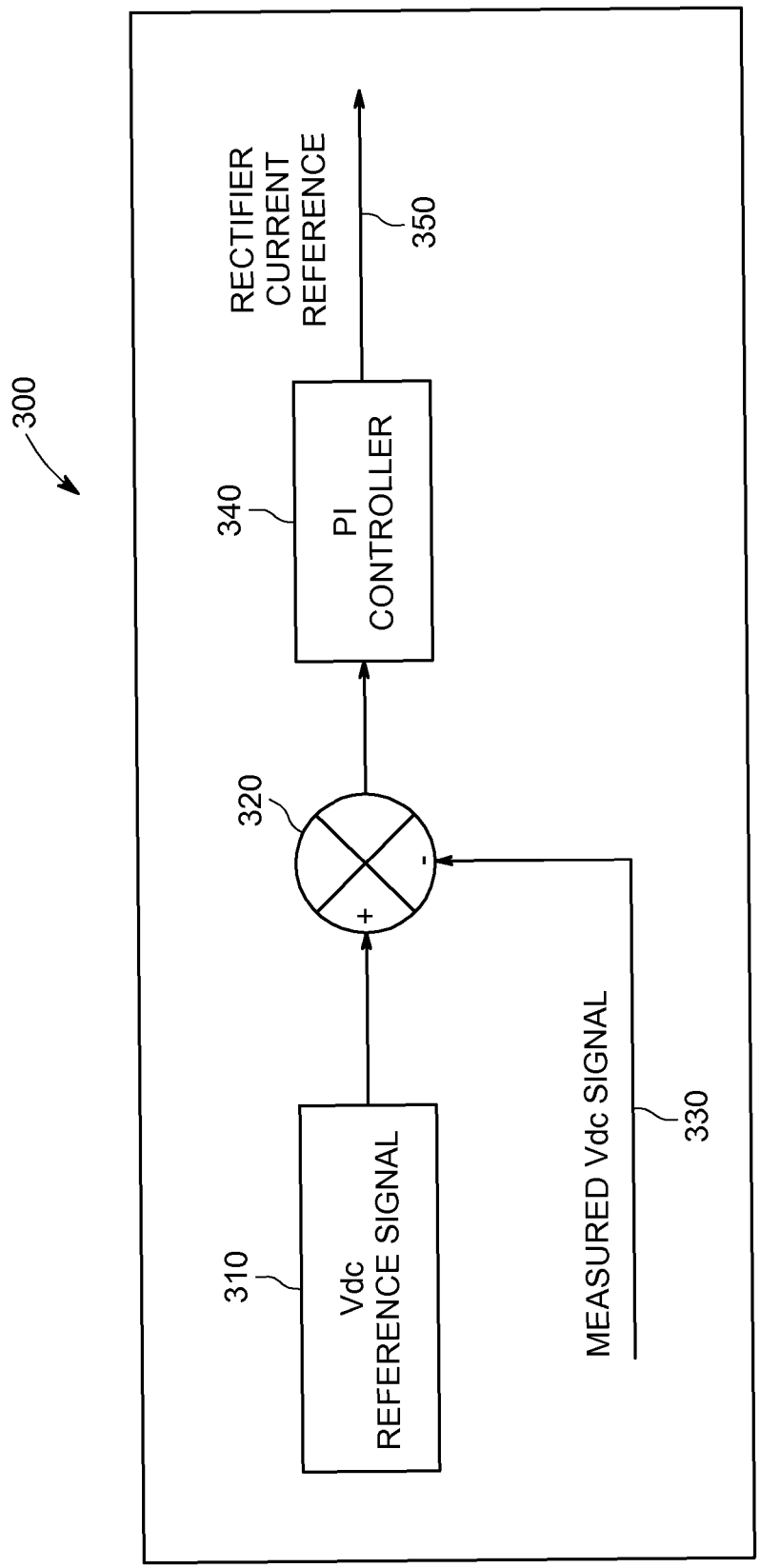
FIG. 3 illustrates a conventional rectifier current reference generation circuit.

FIG. 3 illustrates a block diagram of a conventional rectifier current reference generator 300, wherein a signal corresponding to the required DC voltage (reference) 310 and the signal corresponding to the actual DC link voltage 330 is applied to adder 320. At adder 320, the signal corresponding to the actual DC link voltage 330 is subtracted from the reference signal corresponding to the required (reference) DC voltage 310. The resulting value from the subtraction at adder 320 is applied to controller 340 to generate a rectifier current reference signal 350.

Figure 4:
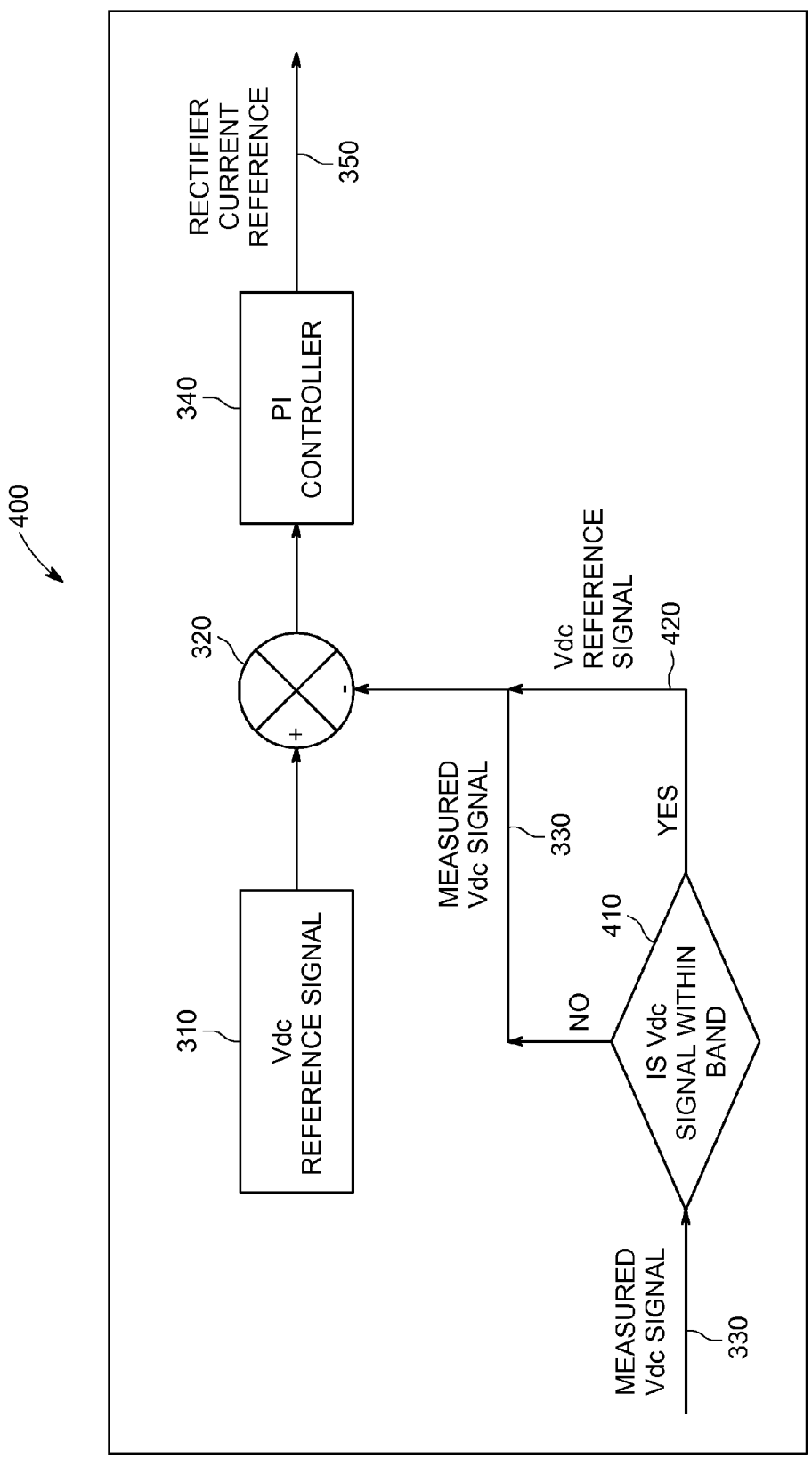
FIG. 4 illustrates a rectifier current reference generation circuit in accordance with the principles of the invention.

FIG. 4 illustrates a block diagram of rectifier current reference generator 400 in accordance with the principles of the present invention. As shown, the signal corresponding to the required DC voltage (reference) 310 is applied to adder 320, as previously described. A determination is made whether the signal corresponding to the actual DC link voltage 330 is within a known band, at block 410. For example, the voltage band for DC link may be set at a fixed value (e.g., reference DC voltage +/−10 volts) or may be set as a percentage of the reference DC voltage (e.g. reference DC voltage +/−5% or +/−10% etc). If the signal corresponding to the measured DC voltage 330 is outside the known band, then the signal 330 itself is applied to adder 320. Otherwise, the signal corresponding to the reference DC voltage is applied to the adder 320. The difference between the signal corresponding to reference DC voltage 310 and determined DC signal is applied to controller 340 to generate a rectifier current reference signal 350, as previously described. The generated current reference signal 350 is applied as an input to the conventional rectifier control loop 205 (FIG. 2A).

In one aspect of the invention, the addition of the fourth leg modulation signal to the conventional rectifier modulation signals is advantageous for the cancellation of circulating neutral currents.

In another aspect of the invention control as described in FIG. 4, is advantageous so that input harmonics will be not be affected due to various load conditions.

In another aspect of the invention, determining the fourth leg modulation based on synchronized mode or free running mode operation is advantageous to obtain sinusoidal input currents for the respective operation modes.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While there has been shown, described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for managing a four-leg transformerless Uninterrupted Power Supply (UPS) comprising:
a rectifier modulation signal generator generating rectifier modulation signals;
a 3-leg inverter modulation signal generator generating inverter modulation signals;
a conversion module receiving said rectifier modulation signals and said inverter modulation signals and determining compensated rectifier modulated signals and 4 leg inverter modulation signals based on at least one of a measured rectified DC voltage and a frequency of said input AC signal;
a rectifier PWM signal generator receiving said compensated rectifier modulated signals generating PWM rectifier signals;
a 4-leg inverter PWM signal generator receiving said 4 leg inverter modulation signals generating PWM inverter signals, and a UPS comprising:
a rectifier section receiving an input AC signal and rectifying said input signal based on said Pulse Width Modulated (PWM) rectifier signals;
an inverter section receiving and inverting the rectified DC signals based on said Pulse Width Modulated inverter signals.

2. The system of claim 1, wherein said conversion module comprises:
means for determining an input frequency of signals received from said input AC signal;
means for determining a $4^{th}$ leg modulation signal based on said input frequency and said 3 leg inverter modulation signals;
means for determining said 4 leg inverter modulation signals based on said $4^{th}$ modulation signal and said 3 leg inverter modulation signal.

3. The system of claim 2, wherein said conversion module further comprises:
means for determining said compensated rectifier modulated signals based on received rectifier modulation signals and said determined $4^{th}$ leg modulation signal.

4. The system of claim 2, wherein said means for determining a $4^{th}$ modulation signal comprises:
means for determining whether said input frequency is within a known range about a nominal frequency; and
means for setting said $4^{th}$ leg modulation signal to said nominal frequency and a level corresponding to a known proportion of a DC link voltage when said input is outside said known range about said nominal frequency.

5. The system of claim 2, wherein said means for determining a $4^{th}$ leg modulation signal comprises:
means for determining whether said input frequency is within a known range about a nominal frequency; and
means for determining a level of said $4^{th}$ leg modulation signal based on a weighted percentage of said 3 leg inverter modulation signals.

6. The system of claim 5, wherein said $4^{th}$ leg modulation signal is determined based on a minimum and a maximum of said 3 leg inverter modulation signals and a DC link voltage.

7. The system of claim 2, wherein said $4^{th}$ modulation signal is used to generate a neutral from inverter's fourth leg.

8. The system of claim 1, wherein said rectifier modulation signal generator receives a current reference, said current reference being determined based on a measured DC voltage being within a known range of a DC Link voltage.

9. The system of claim 1, further comprising a neutral associated with said input AC signal.

10. A method for managing a four-leg transformerless Uninterrupted Power Supply (UPS) a rectifier section and a 4 leg inverter section, the rectifier section receiving compensated rectifier control signals and said 4 leg inverter receiving inverter control signals, said method comprising:
determining an input frequency of reference signals received from said AC input section;
determining a $4^{th}$ leg modulation signal based on said input frequency, and determining said inverter control signals based on said 3 leg inverter modulation signals and said determined $4^{th}$ leg modulation signal.

11. The method of claim 10, further comprising:
determining said compensated rectifier control signals based on received rectifier modulation signals and said determined $4^{th}$ leg modulation signal.

12. The method of claim 10, wherein said determining a $4^{th}$ modulation signal comprises:
determining whether said input frequency is within a known range about a nominal frequency; and
setting said modulation signal to said nominal frequency and a level corresponding to a known proportion of a DC link voltage when said input is outside said known range about said nominal frequency.

13. The method of claim 10, wherein said determining a $4^{th}$ leg modulation signal comprises:
determining whether said input frequency is within a known range about a nominal frequency; and
determining a level of said $4^{th}$ leg modulation signal based on a weighted percentage of said 3 leg inverter modulation signals.

14. The method of claim 13, wherein said $4^{th}$ leg modulation signal is determined based on a minimum and a maximum of said 3 leg inverter modulation signals and a DC link voltage.

15. The method of claim 10, wherein said rectifier modulation signal generator receives a current reference, said current reference being determined based on a measured DC voltage being within a known range of a DC Link voltage.

16. The method of claim 10, wherein said $4^{th}$ modulation signal is used to generate a neutral from inverter's fourth leg.

17. An apparatus for managing a four-leg transformerless Uninterrupted Power Supply (UPS) a rectifier section and a 4 leg inverter section, the rectifier section receiving compensated rectifier control signals and said 4 leg inverter receiving inverter control signals, said apparatus comprising:
a processor in communication with a memory, the memory including code which when accessed by the processor causes the processor to:
determine an input frequency of reference signals received from said AC input section;
determine a $4^{th}$ leg modulation signal based on said input frequency, and
determine said inverter control signals based on said 3 leg inverter modulation signals and said determined $4^{th}$ leg modulation signal.

18. The apparatus of claim 17, said processor further accessing code to:
determine said compensated rectifier control signals based on received rectifier modulation signals and said determined $4^{th}$ leg modulation signal.

19. The apparatus of claim 17, wherein said determining a $4^{th}$ leg modulation signal comprises:
determining whether said input frequency is within a known range about a nominal frequency; and
setting said modulation signal to said nominal frequency and a level corresponding to a known proportion of a DC link voltage when said input is outside said known range about said nominal frequency.

20. The apparatus of claim 17, wherein said determining a $4^{th}$ leg modulation signal comprises:
determining whether said input frequency is within a known range about a nominal frequency; and
determining a level of said $4^{th}$ leg modulation signal based on a weighted percentage of said 3 leg inverter modulation signals.

21. The apparatus of claim 20, wherein said $4^{th}$ leg modulated signal is determined based on a minimum and a maximum of said 3 leg inverter modulation signals and a DC link voltage.

22. The apparatus of claim 17, wherein said rectifier modulation signal generator receives a current reference, said current reference being determined based on a measured DC voltage being within a known range of a DC Link voltage.

23. The apparatus of claim 17, wherein said $4^{th}$ leg modulation signal is used to generate a neutral from inverter's fourth leg.

* * * * *